United States Patent [19]
Saito

[11] 3,992,961
[45] Nov. 23, 1976

[54] NUMERICALLY CONTROLLED REVERSIBLE GEAR SYSTEM FOR REMOVING BACKLASH

[75] Inventor: Kojiro Saito, Saitama, Japan

[73] Assignee: Yutaka Seimitsu Kogyo Ltd., Yono, Japan

[22] Filed: Sept. 4, 1975

[21] Appl. No.: 610,261

[52] U.S. Cl. ............................................... 74/409
[51] Int. Cl.² ..................................... F16H 55/18
[58] Field of Search .......... 74/409, 440, 410, 421 A

[56] References Cited
UNITED STATES PATENTS

| | | | |
|---|---|---|---|
| 3,478,514 | 11/1969 | Parker | 74/409 X |
| 3,889,549 | 6/1975 | Fieuzal et al. | 74/409 |

Primary Examiner—Leonard H. Gerin
Attorney, Agent, or Firm—Silverman & Cass, Ltd.

[57] ABSTRACT

A numerically controlled reversible gear system with a main output gear using two driving gears with a same number of teeth each coupled to respective one of a pair of pulse motors with same specifications connected to a single controlling equipment, wherein the driving gears are meshed with said main gear after rotationally shifting them in opposite direction by a same number of teeth within a range of attraction of respective phase of the pulse motors and either one gear acts as a driving element depending upon the direction of rotation so as to eliminate backlash of the main gear.

1 Claim, 12 Drawing Figures

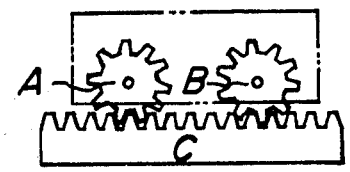
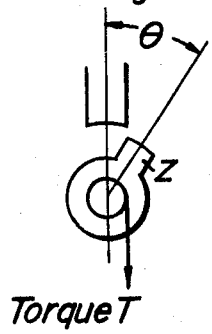
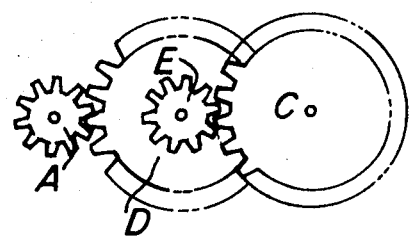
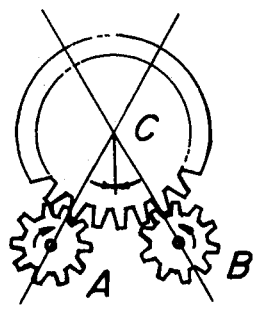
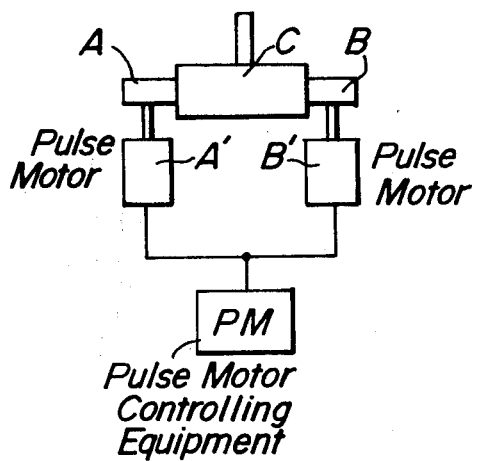
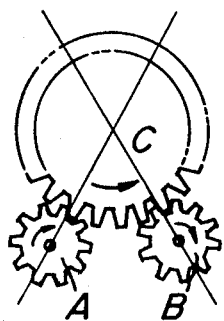

NUMERICALLY CONTROLLED REVERSIBLE GEAR SYSTEM FOR REMOVING BACKLASH

BACKGROUND OF THE INVENTION

1. Field of the Invention

The present invention relates to a numerically controlled reversible gear system for removing the backlash in all the driving stages, i.e. at stopping, forward running, backward running and for improving accuracy of the stopping position so as to decrease an error caused by the angular deviation of the system.

2. Description of the Prior Art

A numerical controlled equipment is generally controlled by output pulses delivered from a control equipment and for instance the pulses are supplied to necessary servo motors such as an X direction servo motor and a Y direction servo motor according to a predetermined program and an output head is driven in a desired pattern determined by the program. In the conventional driving systems, there is a certain mechanical play due to the mechanism at a switching between a forward running and a backward running. Accordingly, for instance, if 10 pulse backward running is instructed after an instruction of 10 pulse forward running from an original position, the output head may not return to the original position correctly and thus the stopping position shows a certain deviation. This deviation is termed as "backlash" and various measures have been considered for compensating the same. The hitherto known backlash compensating apparatus of the numerical controlled machining equipment are generally of very complicated mechanism and have difficulties in view of their compensation accuracies despite their high cost.

The problems of the conventional numerical controlled equipment may be summerized in more detail below.

1. The amount of backlash is an analog amount, whereas the automatic compensation of the backlash is generally effected by a digital amount so that a perfect compensation is difficult.
2. The automatic backlash compensation is effected only at a time of switching the driving direction so that a backlash produced during in either directional rotation or in stopping condition can not be removed.
3. When the rotation of the pulse motor is stopped, moving parts of the equipment may stop at a position having a certain deviation within the range of the backlash of the gear system by the moment of inertia of the moving parts or in a range added with an error of angular deviation thereto so that the accuracy of the stopping position may decrease accordingly.
4. When a rotation instruction is given to the pulse motor, an angular deviation error may produce due to static and dynamic characteristics inherent to the pulse motor itself, and by the presence of friction, torque and moment of inertia of the mechanical systems. Therefore, there will be a case that the rotational instruction pulses less than a certain number of few pulses are not sufficient to properly drive the system.
5. An automatic backlash compensation device generally becomes complicated and hence it becomes costly and it may cause many troubles during the operation.

SUMMARY OF THE INVENTION

The present invention is to solve the aforementioned problems by introducing a very simple construction. The present invention is to provide a novel system of the numerical controled equipment having salient features summerized below.

a. The backlash may substantially be removed in all stages of the operations, e.e. stopping, forward rotation, and backward rotation.
b. The inertia of movement may be suppressed even in case of a sudden stop and hence the accuracy of the stopping position may greatly be improved.
c. The equipment may sufficiently respond to repeated single pulse instruction of forward rotation and backward rotation.
d. An arithmetically procesing automatic apparatus for the backlash may completely be dispensed with.
e. The equipment may be assembled in simple and inexpensive manner.

The essential feature of the present invention lies in that the main output gear is meshed with two driving gears with a same number of teeth each coupled to respective one of a pair of pulse motors with same specifications driven from an identical controlling equipment wherein the two driving gears are meshed with the main output gear after rotationaly shifting them in opposite directions by an identical number of teeth within a range of attraction of respective phase of the pulse motors and either one of the gears acts to drive the main output gear depending on the direction of rotation of the main gear instructed from the controlling equipment so as to eliminate the backlash.

The principle of the invention will be explained by referring to the accompanied drawings.

BRIEF DESCRIPTION OF THE DRAWINGS

FIG. 7 is an explanatory diagram of an essential portion of a pulse motor, FIGS. 8 and 9 are explanatory diagrams for showing the main component of the present invention, FIGS. 10 and 11 are also the explanatory diagrams for showing the main components in two different embodiments of the present invention, and FIG. 12 is a diagram for showing the general construction of the system of the present invention.

EXPLANATION OF THE PREFERRED EMBODIMENTS

Before explaning the detailed feature of the present invention, an ordinary character of a pulse motor will be explained.

Figure 1:
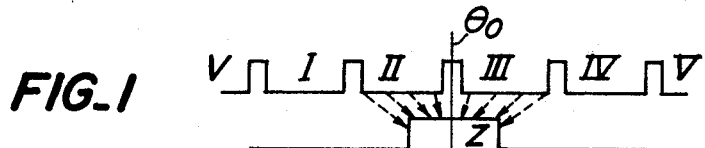
FIG. 1 is a diagram for explaining the balance between a rotor pole and each stator phase of a pulse motor.

FIG. 1 illustrates very schematically a relation between stator poles each termed as phase and a rotor pole. In FIG. 1, the portions designated by I, II, III, IV, V represent stator poles or phases excited by the supply current. When we assume that poles II and III are excited, the rotor pole Z is attracted by fluxes of the two poles II and III and is stopped at a neutral position of which center is designated by $\theta_0$ where two attractive forces are balanced. At this condition, if an outer power having torque T is applied to the output shaft of the pulse motor, the rotor pole Z moves to result an angular deviation $\theta$ as shown in FIG. 7.

Figure 2:
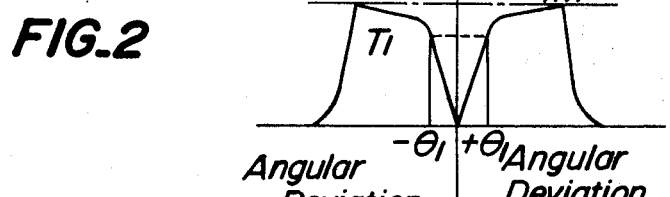
FIGS. 2 to 4 are characteristic diagrams showing relation between torque and angular deviation of a pulse motor.

The relation between the angular deivation $\theta$ and the torque T is for instance shown in FIG. 2. The characteristic curve shown in FIG. 2 is generally termed as a static characteristic of a pulse motor. As can be seen from FIG. 2, the torque T should increase according to an increase of the angular deviation $\theta$ from O. The torque T assumes its maximum value Tm at an instance when the rotor pole Z locates in the most unbalanced position for the opposite stator pole and it suddenly decreases thereafter. The maximum torque Tm is termed as the maximum stationary torque. Also as can be seen from FIG. 2, the stopping point $\theta_0$ is a place where the two attractive forces of the poles II and III are balanced and the output torque for outside becomes zero at this point.

If we assume that a frictional torque $T_1$ which corresponds to a load torque is included in the mechanical system, the rotor stops at a point having angular deviation $\theta_1$ from the aforementioned point $\theta_0$ wherein the output torque of the pulse motor is balanced by the frictional torque $T_1$. This means that the stopping position shows a certain deviation from the point $\theta_0$ in the range of $\pm\theta_1$ as can be seen from the $\theta.'$ curve shown in FIG. 2. This deviation increases according to an increase of the frictional torque $T_1$ with respect to the output torque of the pulse motor and this may cause deterioration of the accuracy of the stopping position of the pulse motor.

The present invention is to realize a driving system of a numerical controlled equipment in which the above explained backlash can nearly perfectly be removed and the accuracy of the stopping position may greatly be improved and the angular deviation error is minimized.

The general driving system of the present invention is illustrated in FIG, 12 and the essential portion is shown in FIGS. 8 and 9.

Now referring to FIG. 12, PM generally shows a driving controlling equipment being able to control two pulse motors A' and B' with same specifications connected thereto. As a simple example, a main output gear is shown by C, to which two driving gears A and B with a same number of teeth are meshed. The first gear A is directly coupled to an output shaft of the first pulse motor A' and the second gear B is directly coupled to an output shaft of the second pulse motor pulse motor B'. The gears A and B may be coupled to the respective pulse motors A' and B' via certain gear trains as an alternative. As can be seen from FIGS. 8 and 12, the main gear C is driven by two gears A and B coupled to the respective pulse motors A' and B' which in turn are controlled by a single driving control equipment PM.

Figure 3:
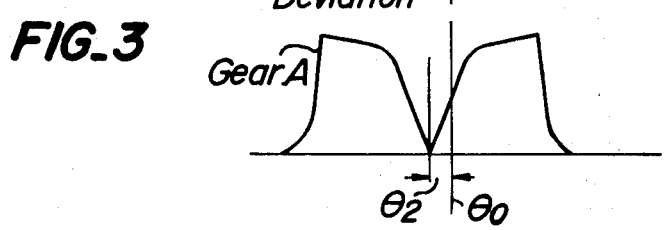

First of all, the removal of the backlash will be explained. At the time of assembling the equipment, both the pair of gears A and B are arranged not to mesh with the main output gear C and the two pulse motors A' and B' are energized. The pulse motors A' and B' are coupled to a single controlling equipment PM and driven in sychronism. Assuming that both the pulse motors A' and B' have stopped at a position corresponding to the balanced condition shown in FIG. 1, then they will have the static characteristic such as shown in FIG. 2. Thereafter both the pulse motors are deenerginzed and the gear A coupled to the pulse motor A' is rotated for instance in counterclockwise direction by a suitable teeth number of the gear and within the range of attraction of the two poles II and III of FIG. 1 while keeping the gear C in the stopped position and then meshed with the main gear C without backlash. In this case, the static characteristic of the pulse motor A' varies as shown in FIG. 3. Namely, the characteristic curve moves in parallel to a position shifted by an angle $\theta_2$ from the neutral balanced angle $\theta_0$. Then the gear B coupled to the pulse motor B' is rotated in clockwise direction by the same teeth number as the rotational displacement of the gear A and meshed with the gear C without backlash. In this case, if we assume that there has not been a rotational shift of the gear A in the counterclockwise direction, the static characteristic of the pulse motor B' should become as shown in FIG. 4.

After meshing the gears A and B with the main gear C in the manner as mentioned above, the pulse motors A' and B' are energized again. Then the pulse motor A' produces a torque in a direction toward the neutral position of balancing of the attraction forces produced by the poles II and III as shown in FIG. 3 and applies a clockwisely rotational force to the gear A as indicated by an arrow mark shown in FIG. 8.

Figure 4:

On the other hand the pulse motor B' produces a rotational force in a direction toward the neutral position of balanciing the attractive forces of the poles II and III as shown in FIG. 4. Therefore the gear B applies a counterclockwise rotational force to the main gear C as shown in FIG. 8.

The main gear C is meshed with two gears A and B as shown in FIG. 8. Accordingly, the two torques produced by the angular displacement of the pulse motors A' and B' balance each other at the main gear C through the meshing gear A and B, so that the main gear C does not rotate but is rigidly held in the position. This result had been obtained by rotationally shifting the two gears A and B in opposite directions by the same number of teeth, respectively. The produced torque shown in FIG. 3 and that shown in FIG. 4 are of the same value and the directions are in opposite each other. This fact may more clearly be understood by referring to FIGS. 5 and 8.

Figure 5:
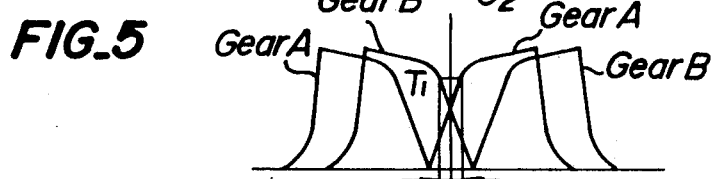
FIGS. 5 and 6 are characteristic diagrams showing relation between torques and angular deviations of two pulse motors for explaining the present invention.

If we assume that a forward running is instructed from the driving controlling equipment PM. As explained above, since the pulse motors A' and B' are controlled by an instruction from an identical driving controlling equipment, the pulse motors A' and B' both rotate in forward direction and the gears A and B both rotate in clockwise direction by identical steps as shown in FIG. 9 and the main gear C rotates in counterclockwise direction. In this case, the gear A becomes as the main driving gear. The other gear B is also given a rotating driving force in the same direction of the gear A by the pulse motor B', but the gear B still maintains a relation with the main gear C to hold it and to compensate any play of the main gear C as shown in FIGS. 5 and 8. Accordingly, the gear B rotates to keep the backlash of the main gear C to be nearly perfectly zero value either in stopping or rotating situation. Moreover the gear B does never prevent the desired rotation of the main gear C. When the pulse motors A' and B' are deenergized after rotating a certain instructed number, the gear system stops in the condition shown in FIGS. 5 and 8.

Next we may consider a case when a backward rotation is instructed from the driving controlling equipment PM. In this case both the pulse motors A' and B' rotate in reverse direction. The gears A and B are given rotating force in counterclockwise direction and the main gear C rotates in clockwise direction while keeping the relation shown in FIGS. 5 and 8. This time the gear B becomes the main driving gear and the gear A functions to keep the backlash to be zero.

In other words, when the pulse motors rotate in forward direction, the gear A acts to drive the main gear C and when the pulse motors rotate in backward direction, the gear B acts to drive the main gear C. In both occasions, the other gear acts to keep the backlash to be zero. By the cooperation of the two gears, the backlash of the main output gear C is substantially suppressed to be zero in the stopping or rotating condition.

The present invention can be applied in different systems such as shown in FIGS. 10 and 11. FIG. 10 shows a case of driving a rack C by two pinions A and B. FIG. 11 shows a case of driving a main output gear C by a gear train A–D–E and another gear train B–F–G, not fully shown in the figure, with the same gear ratio as A–D–E. The driving principle of the embodiments shown in FIGS. 10 and 11 is exactly same as explained above so that detailed explanation for these embodiments is omitted.

In addition to the abovementioned removal of the backlash, the driving system according to the present invention is useful to greatly improve the accuracy of the stopping position of a numerical controlled system. Namely the backlash removing driving system as explained above is in the same form also effective to increase the accuracy of the stopping position of the system. This improvement of the accuracy of the stopping position will be explained in detail hereinafter.

Referring again the FIG. 2, which shows a characteristic diagram of an ordinary pulse motor in which the abscissa represents angular deviation $\theta$ and the ordinate represents the produced torque T. We may assume that there is a frictional torque $T_1$ which corresponds to the load torque in the mechanical system. This frictional torque $T_1$ is smaller than the maximum produced torque $Tm$ of the pulse motor i.e. $Tm > T_1$ so that the pulse motor tends to step toward the neutral point $\theta_0$ but stops at point $\theta_1$ where the produced torque balances with the frictional torque $T_1$. In case if the pulse motor is driven in forward and backward directions alternately, the angular deviation of the stopping position will be $\pm\theta_1$. In FIG. 2, the two crosspoints between the $\theta.^T$ curve and the line indicating the frictional torque $T_1$ show the fact that the stopping angular deviation of the conventional pulse motor is in a range of $\pm\theta_1$. This deviation results deterioration of the accuracy of the stopping position. Furthermore, if a sudden stop is instructed during rotation of the pulse motor, the pulse motor responds to stop immediately but the mechanical moving part thereof tends to continue the movement by the presence of an inherent inertia so that a certain amount of deviation of the stopping position results within a range of the backlash or within a range of balancing of the counter torque produced by the angular deviation and this also causes deterioration of accuracy of the stopping position.

As explained above with respect to the removal of the backlash, an overall static characteristic shown in FIG. 5 can be obtained if the gears A and B are meshed with the main gear C after rotating the gear A in counterclockwise direction and after rotating the gear B in clockwise direction by the same number of teeth. Referring to FIG. 5, it can be understood that the frictional torque having the value $T_1$ is same as that of the conventional one but the angular deviation $\pm\theta_1'$ obtained at the crossing points between the line $T_1$ and the $\theta.^T$ curves of the gears A and B is much smaller than the case of FIG. 2. This can be explained in that the resultant torque produced by the angular deviation of the pulse motor and obtained from the $\theta.^T$ curve is unchanged but since the gears A and B are meshed with the main gear C after giving a certain shift so that the angular deviation caused by the amount of $\pm\theta_1$ becomes smaller and the produced torque becomes much larger. Therefore although the frictional torque $T^1$ is unchanged from the case of FIG. 2, the angular deviation $\pm\theta_1$ becomes much smaller than the case of FIG. 2 and thus the accuracy of the stopping position may greatly be improved.

Figure 6:
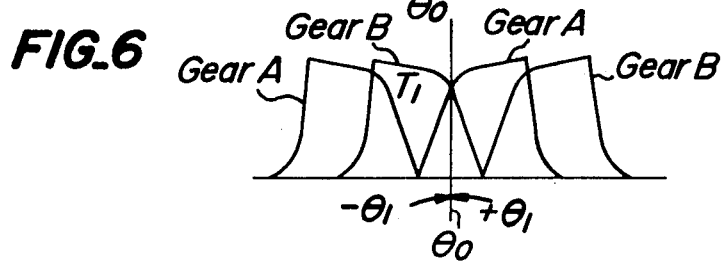

By further shifting the gears A and B and then mesh them with the gear C in a condition as shown in FIG. 6, the deviation angle $\theta_1$ becomes zero as illustrated. As can be seen from this diagram the deviation angle $\theta_1$ may be made as zero theoretically so that the accuracy of the stopping position can greatly be improved.

An improvement of the angular deviation may be explained. It can be understood that the produced torque becomes larger according to an increase of the angular deviation. This can be understood from FIG. 2. In case if the frictional torque of the mechanical system is larger than the produced torque, the motor does not move even the rotating instruction is given. By an increase of the applied pulses such as 2 pulses, 3 pulses or so then the produced torque becomes larger and the motor starts to move by overcoming the frictional torque. Accordingly, in the conventional numerical controlled equipment, there had been cases in which the motor does not move under application of pulses less than a certain number of pulses. Contrary to above, according to the present invention, the resultant characteristic curve may assume as shown in FIG. 6 as an ideal case, even an application of only one pulse a large torque results and the motor well respond even for the repeated instruction of plus (+) and minus (−) pulses so that the error caused by the angular deviation may greatly be improved.

As explained in the foregoing, the present invention is based on a very simple idea of using two gears A and B with a same number of teeth each coupled with two pulse motors A' and B' with same specifications connected to an identical controlling equipment either directly or through a gear and meshing the gears A and B to a main gear C after rotationally shifting in opposite direction by the same number of teeth, the backlash can substantially perfectly be removed in the numerical controlled equipment and furthermore the accuracy of the stopping position and angular deviation can be improved without any need of introduction of an automatic, arithmetic compensation operation equipment.

What is claimed is:

1. A numerically controlled reversible gear system for removing backlash comprising a main output gear, first and second driving gears each having the same number of teeth thereon, first and second pulse motors having substantially the same specifications, each pulse motor having a rotor pole and stator poles and a rotationally neutral position wherein the attractive force between respective rotor pole and stator poles is balanced, a frame body mounting said main output gear, said first and second driving gears and said first and second pulse motors, a numerical controlling equipment coupled to said first and second pulse motors for identically controlling said first and second pulse motors' rotation, said first driving gear being coupled to said first pulse motor and meshed with said main output gear, said second driving gear being coupled to said second pulse motor and meshed with said main output gear, said first and second driving gears being meshed with said main output gear with said first and second pulse motors being shifted from said neutral position in equal and opposite directions by a predetermined number of teeth in said driving gears so that an attractive force exists between the respective rotor pole and stator poles in said first and second pulse motors.

* * * * *